(12) United States Patent
Sies et al.

(10) Patent No.: US 6,225,716 B1
(45) Date of Patent: May 1, 2001

(54) COMMUTATOR ASSEMBLY APPARATUS FOR HALL SENSOR DEVICES

(75) Inventors: Duane J. Sies; Thomas R. Giuffre, both of Freeport, IL (US)

(73) Assignee: Honeywell International Inc, Morristown, NJ (US)

( * ) Notice: Subject to any disclaimer, the term of this patent is extended or adjusted under 35 U.S.C. 154(b) by 0 days.

(21) Appl. No.: 09/211,924

(22) Filed: Dec. 15, 1998

(51) Int. Cl.⁷ .............................. H02K 5/22; H02K 1/18
(52) U.S. Cl. ................. 310/68 B; 310/71; 310/DIG. 6; 324/207.2; 324/207.25
(58) Field of Search ................... 310/68 B, 71, 310/DIG. 6; 324/207.2, 173, 174

(56) References Cited

U.S. PATENT DOCUMENTS

| | | | |
|---|---|---|---|
| 4,847,527 | * | 7/1989 | Dohogne ........................... 310/218 |
| 5,319,277 | * | 6/1994 | Materne et al. ................... 310/239 |
| 5,581,179 | * | 12/1996 | Engel et al. ...................... 324/207.2 |

FOREIGN PATENT DOCUMENTS 58-092865 * 6/1983 (JP) ..................................... 324/174

OTHER PUBLICATIONS

Websters's New Riverside Dictionary, p. 898, Definition of "Plane", 1994.*

* cited by examiner

Primary Examiner—Karl Tamai
(74) Attorney, Agent, or Firm—Roland W. Norris; Andrew A. Abeyta

(57) ABSTRACT

A commutator assembly has a bracket for the placement and protection of Hall element sensors such as may be used for an electrical commutator assembly or other position locating device. The bracket features a surface containing encasements for each Hall element. The encasements have features for locating the Hall within the encasement by the center lead of each Hall element sensor, each Hall element sensor being spaced from one another at a predetermined distance according to said center lead locating features and being substantially surrounded by said encasement except for the forward surface of said Hall case. The bracket may further include a printed circuit board for electrical connections and an optical encoder assembly for supplementary position information.

16 Claims, 4 Drawing Sheets

Fig. 3

COMMUTATOR ASSEMBLY APPARATUS FOR HALL SENSOR DEVICES

BACKGROUND OF THE INVENTION

1. Field of the Invention

The present invention relates generally to a commutator or position sensing apparatus utilizing magnetically sensitive elements. The present invention relates specifically to motor commutator assemblies sensing ring magnets which pass before packaged Hall sensing elements. The present invention may also be adapted to linear rather than rotary position sensing schemes.

2. Description of the Related Art

A commutator, for present purposes, is defined as an electrical device which takes the changing magnetic signals of an object to be sensed and converts them to electrical signals whereby the position of the target object can be known. As the need for ever increasing sensitivity of position sensing becomes finer, such as in control motor applications or automotive brake sensing systems, the need for accurate placement of Hall or other magnetic sensors becomes greater. Prepackaged Hall sensors, while economical, may not have placement accuracy to accomplish fine position control utilizing known systems.

In the past, commutator boards have located the prepackaged Hall sensors by aligning their plastic packages. However, the plastic package is located around the leadframe of the Hall element with less accuracy than that with which the Hall element is placed on an individual lead of the leadframe. Referencing FIG. 1, a prepackaged Hall sensor 11 will consist of the leadframe having three leads 13, 15, 17 on which is placed the magnetically sensitive Hall effect silicon die 19, usually on the center lead 15. The leadframe including the silicon 19 is then packaged for protection with plastic casing 21. However, the molding of the plastic casing is generally held to a much looser tolerances than the placement of the silicon die 19 on the leadframe. That is, the plastic package 21 may be skewed left or right or tilted so that the center of the package or plastic case 21 does not correspond with the true center position of the silicon die 19 on the leadframe as indicated by the dashed line 23.

However, most known position sensing assemblies using prepackaged Hall sensors locate the position of the Hall element according to the plastic case 21, when a positioning bracket is provided. If a positioning bracket is not provided, the prepackaged Hall sensors are located according to the hole placement on a printed circuit board (PCB) to which such sensors are mounted. However, this is an undesirable situation in that the Hall sensor packages themselves are exposed to misplacement through bumping, bending, or the like in any of a variety of orientations. Also, fixturing of the prepackaged Hall sensors to the PC board is problematic. Further, the known protective placement brackets do not orient the sensors in all axes sufficiently to provide ease of manufacturing assembly and reliable center-to-center distance of the Hall sensors.

It is therefore desirable that a bracket assembly be developed that accurately orients the silicon die of the Hall sensor with respect to each other in as many axes as possible while protecting the placement of the Hall sensors and providing for ease of manufacturability.

SUMMARY OF THE INVENTION

The present invention solves these problems by providing a commutator assembly bracket with encasement for the prepackaged Hall sensors. Each encasement has bosses or extrusions on a backwall thereof which provide a center lead guide slot therebetween in order that the Hall effect silicon dies may be spaced from each other according to their accurate placement on the center lead of the leadframe rather than according to the plastic casing of the prepackaged Hall sensor. The encasement is constructed so that the front wall is partially open, so as not to interfere with the magnetic transients which the Hall element senses. The center guide extrusions are further constructed at a height so as to place the silicon dies at a consistent height and the sidewalls of the encasement protect the Hall package from bumps which may shift it side to side. Thus the present invention provides a commutator assembly having a bracket for consistent placement and protection of the Hall sensor packages with great accuracy between the Hall effect silicon die. The bracket provides ease of placement and assembly for the Hall sensor packages during manufacture of the commutator assembly.

BRIEF DESCRIPTION OF THE DRAWINGS

The present invention will be more fully and completely understood from a reading of the Description of the Preferred Embodiment in conjunction with the drawings, in which:

FIG. 3 is an exploded view front perspective of the commutator assembly of FIG. 2, with the connecting wires removed.

DESCRIPTION OF THE PREFERRED EMBODIMENT

Figure 1:
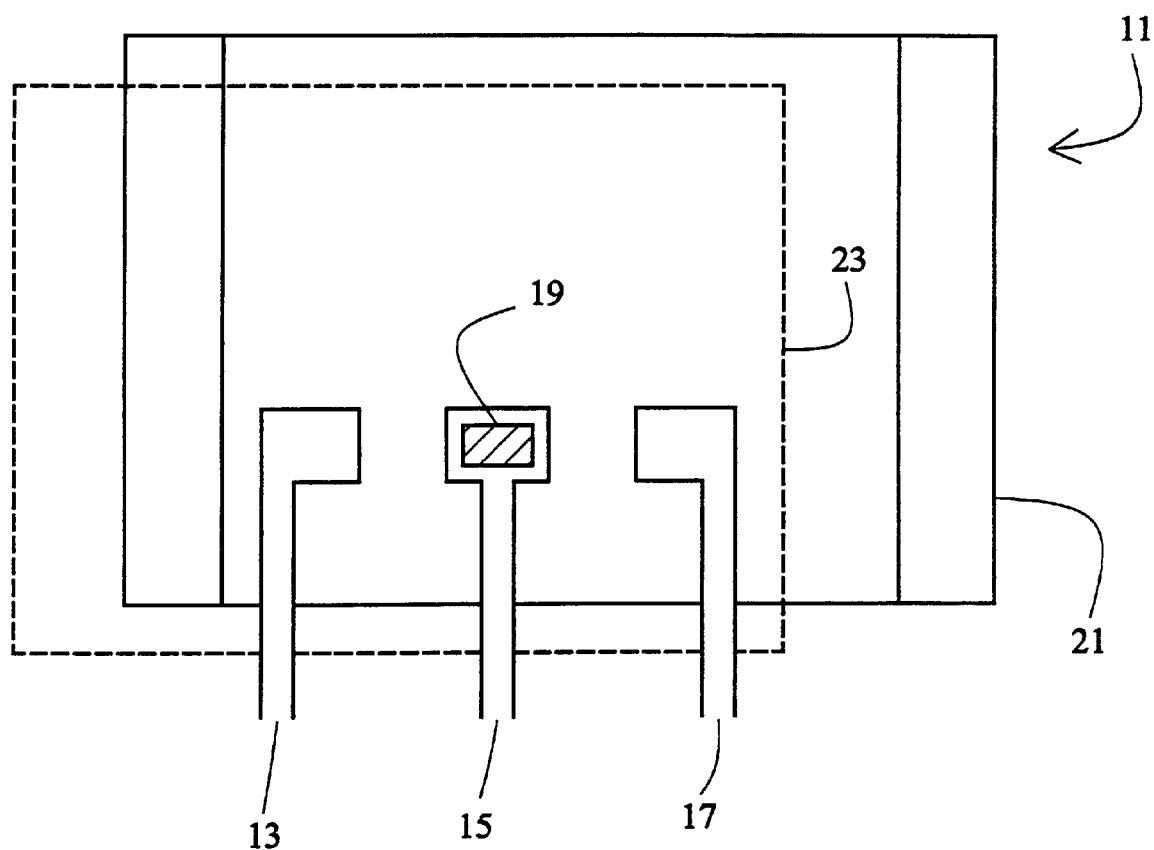
FIG. 1 is a cut away view of a prepackaged Hall sensor showing the plastic case, leadframe, and placement of the Hall effect silicon die on the leadframe.

Throughout the Description of the Preferred Embodiment, like components will be identified by like reference numerals.

Figure 2:
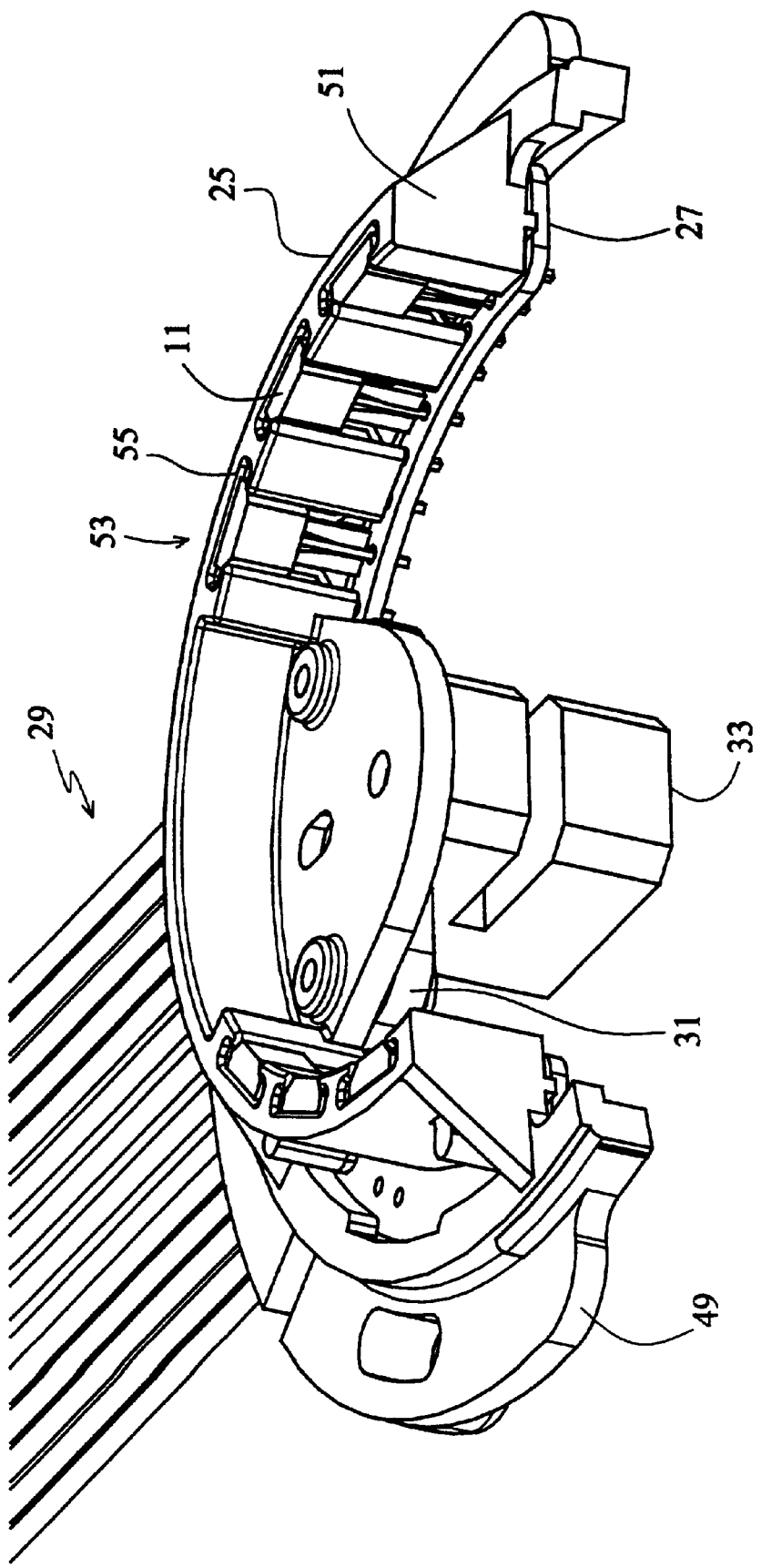
FIG. 2 is a prospective view of a commutator assembly according to the present invention.

The present invention will be described in terms of a commutator assembly for an electrical motor having a ring magnet on the shaft thereof. It will of course be appreciated that the teachings of the present invention may also apply to other situations, such as linear commutator or position sensing apparatus if the Hall sensors are to be placed on a straight line or plane rather than arcuate fashion as shown according to the preferred embodiment. As seen in FIG. 2, the major components of a commutator assembly according to the present invention comprise the Hall placement bracket 25, a PCB 27 for electrical connection of prepackaged Hall sensors elements, collectively 11. Connecting wires, collectively 29, for remote connection of the commutator assembly are also shown. Preferably, but not necessarily, included in the preferred embodiment is a mounting plate 31 for an optical encoder assembly 33 which provides supplemental or redundant positioning information from an optical wheel attached to the motor shaft (not shown).

Figure 3:
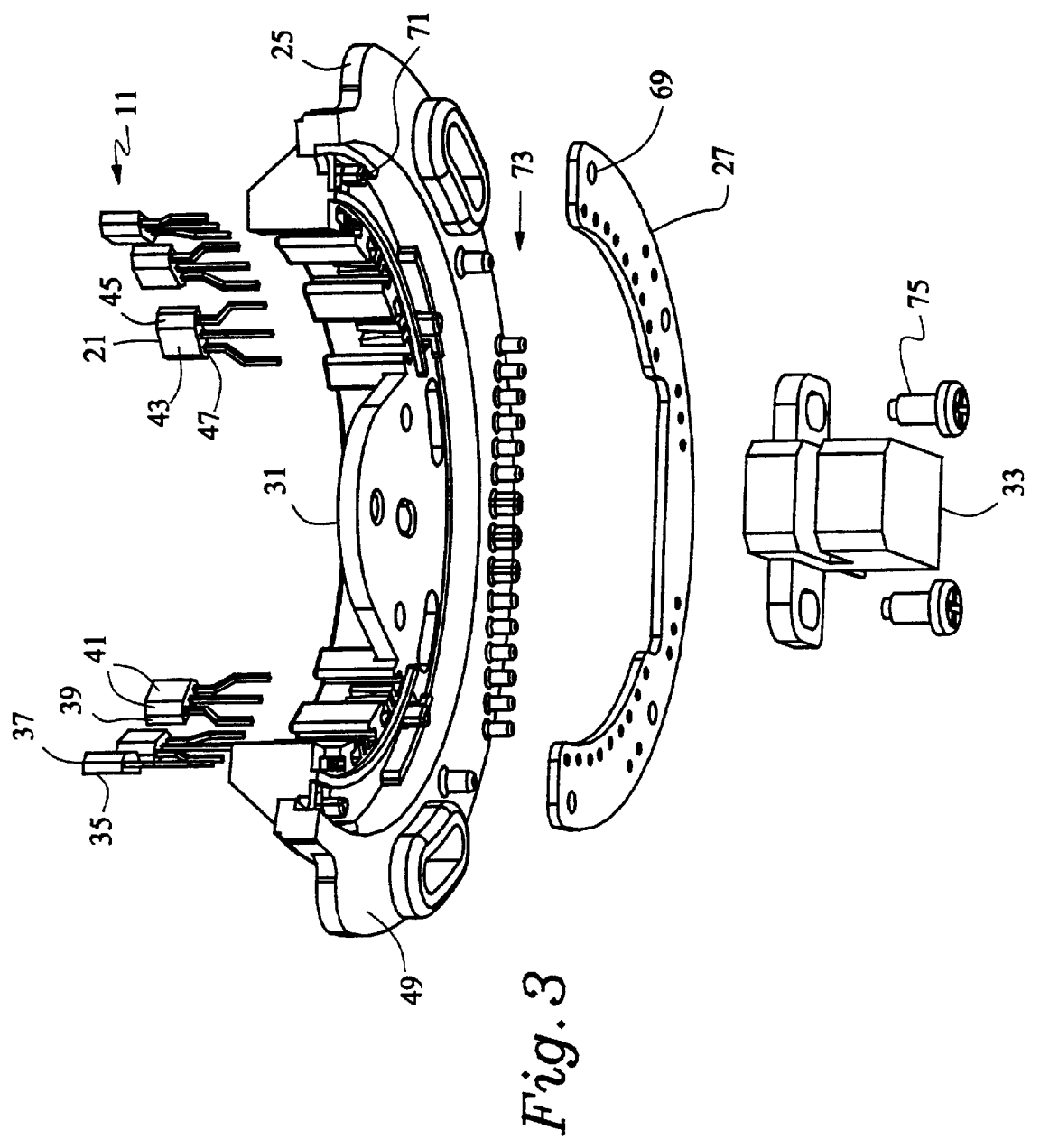

As seen in FIG. 3, a prepackaged Hall sensor 11 typically has a case of plastic or the like 21 which has a rear surface 35, a top surface 37, a side surface 39, and forward surfaces, collectively, 41 including a front surface 43 and an angular surface 45; as well as a bottom surface 47.

Most typically in known systems, the Hall sensor package is located according to the plastic case 21 and most particularly by the angular surface 45.

Referring to FIGS. 2 and 3, the bracket 25 includes a first major surface first plane or first surface 49, or first arcuate surface 49 from which extends at an angle thereto, or generally perpendicular, a second major surface second plane or second surface 51 or second arcuate surface 51 and which contains encasement structures 53 forming voids 55 into which the Hall elements are placed. The void preferably is designed to allow the Hall to fit loosely and center on a center lead guide channel 67 (as seen in FIG. 5) rather than being press fit.

Figure 4:
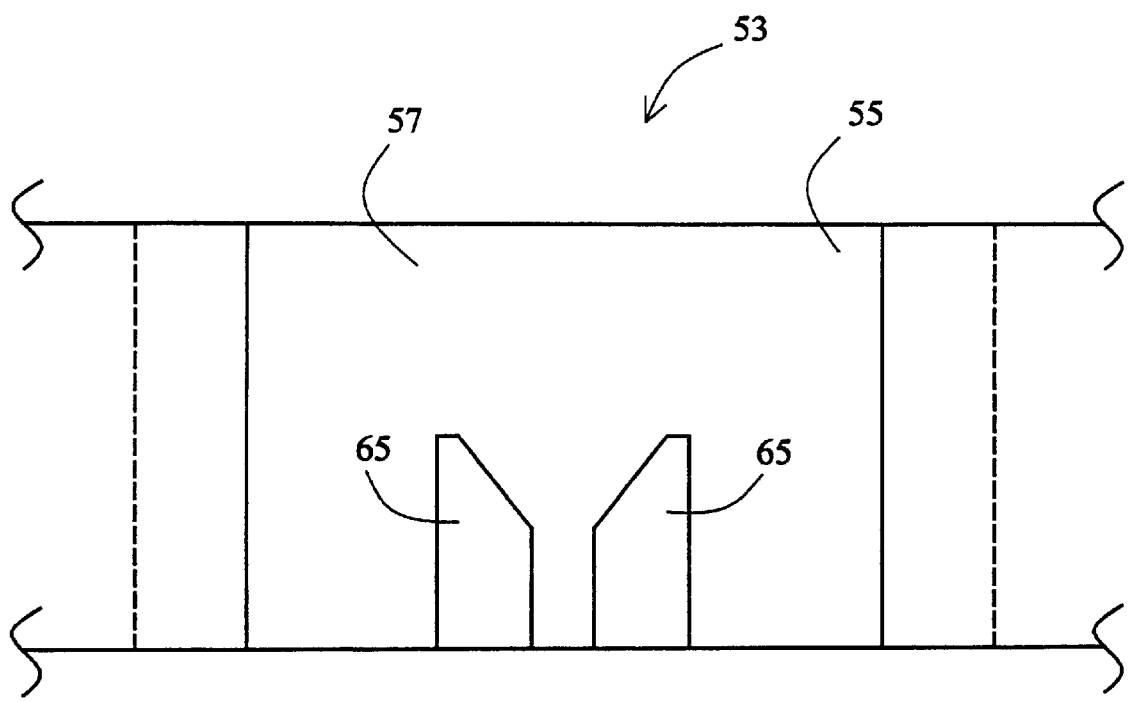
FIG. 4 is a front view of the encasement structure of the bracket of the present invention.
Figure 5:
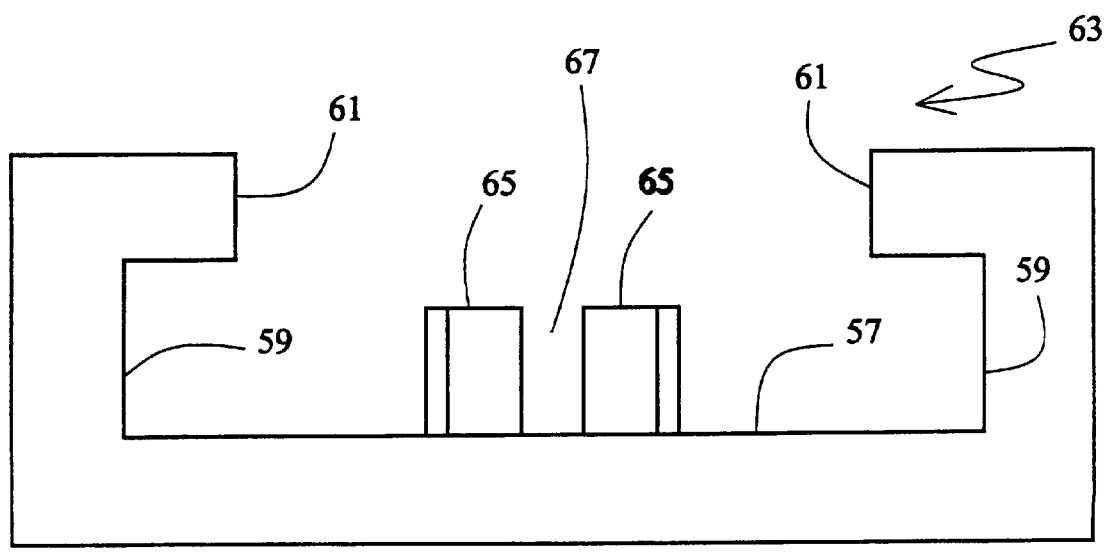
FIG. 5 is a top view of the encasement structure of the bracket of the present invention.

Referencing FIGS. 4 and 5, the encasement structures 53 include a backwall 57, sidewalls 59, and front tabs 61, forming a partially open front wall 63 which allows the magnetic transients of the target object free access to the front surface 43 of the Hall element 11 as seen in FIG. 5. Extending from the backwall 57 are center guide pin or lead pins 65, which form therebetween a center lead guide channel 67. By holding close tolerance of the center lead guide channel great accuracy may be obtained in center-to-center spacing of the Hall silicon dies which are attached to the center lead.

As well seen in FIG. 2, the center guide pins 65 are constructed and arranged to be placed at a height wherein the surrounding walls of the encasement structure 53 are provided with sufficient height, that when the bottom surface 47 of the Hall abuts the center pin extrusion 65, the remaining encasement structure substantially surrounds each prepackaged Hall sensor 11 and most notably the plastic case 21 thereof.

When the word "substantially" is used herein, it is used in its ordinary sense meaning equal to or less than perfectly; i.e. within accepted manufacturing tolerances and as an aid in defining what the unscrupulous copyist should avoid in seeking to recreate the present invention.

Referencing FIG. 3, the PC board 27 is attached to the bracket 25 by placing holes 69 in press-fit relation to posts 71 contained on the bracket 25 to thereby be placed in a position where the PC board may receive the exposed leads of the packaged Hall sensors 11. Manufacturing and fixturing is then a simple matter of placing each Hall sensor 11 in its individual void 55 whereby the bottom surface 47 of each Hall sensor 11 abuts the center guide pin 65 and covers the top of void 55 so that each Hall sensor 11 is confined for soldering operations to the PC board 27. The connecting 29 (FIG. 2) are then placed in the spaces between and around strain relief posts, collectively 73, and suitably attached to the PCB 27 through soldering. The optical encoder assembly 33 can then be affixed to its mounting plate 31 by screws, rivets, or the like 75.

While the present invention has been shown and described with reference to preferred embodiments, many alternatives will become apparent to the ordinarily skilled artisan upon disclosure of the present invention. Therefore the present invention is only to be limited by the claims appended hereto.

Having thus described the invention what is claimed is:

1. A locator bracket for a plurality of Hall element sensors, the Hall element sensors each having a lead frame with a first lead, a center lead, and a third lead, a magnetically sensitive die attached to the center lead, and a case for covering the die and a portion of the lead frame and leaving a portion of said first, center and third leads exposed, the case having a back surface, side surfaces, a top surface, a bottom surface and a forward surface, the bracket comprising:

an encasement for receiving each of said Hall element sensors, each encasement having at least one void for receiving each Hall element sensor, each void further defined by:
 i) a back wall for abutting the back surface of the Hall element sensor case,
 ii) a first side wall and a second side wall for surrounding the side surfaces of the Hall element sensor case, the back wall coupled between the first side wall and the second side wall,
 iii) a first front tab coupled to the first side wall opposite the back wall coupling and a second front tab coupled to the second side wall opposite the back wall coupling, the first front tab, first side wall, back wall, second side wall and second front tab formation creating a partially open front wall for abutting the forward surface of the Hall element sensor case, and
 iv) at least two center lead guide pins extending from the back wall and centered thereon between the first and second side walls which form a center lead guide channel between adjacent pins and being a predetermined height for abutting the bottom surface of each Hall element sensor case, each lead guide channel being a predetermined distance from adjacent lead guide channels each pin having a predetermined height,
the first front tab, first side wall, back wall, second side wall and second front tab formation having a height extending above the height of the center lead guide channel so as to substantially encompass the back surface, the side surfaces and a substantial portion of the bottom surface of each Hall element sensor case.

2. The bracket according to claim 1 wherein;
the first front tab and the second front tab are constructed and arranged to surround the Hall element sensors at forward surfaces thereof which are angular to the back surfaces.

3. The bracket according to claim 2 wherein;
the bracket further has an underside surface, the bracket further comprising means for receiving and securing a printed circuit board to the underside surface.

4. The bracket according to claim 3 wherein; the printed circuit board has holes for receiving the first, center and third leads.

5. The bracket according to claim 4 wherein;
the printed circuit board holes for receiving are spaced at a predetermined distance relative to the center of the lead guide channel.

6. The bracket according to claim 5 further comprising:
a receiving plate for mounting an optical encoder thereon.

7. The bracket according to claim 6 further comprising:
strain relief means for attaching connecting wires.

8. The bracket according to claim 7 wherein;
the strain relief means are pins extending from a substantially planar surface of the bracket.

9. The bracket according to claim 8 further comprising:
a plurality of mounting holes for attachment of the bracket to other assemblies.

10. A commutator assembly comprising:
a.) a plurality of Hall element sensors, each Hall element sensor having a lead frame with a first, a center and a third lead, a magnetically sensitive die attached to the center lead, and a case for covering the die and a portion of the lead frame and leaving a portion of the first, center and third leads exposed, the case having a back surface, side surfaces, a top surface, a bottom surface and a forward surface and b.) a locator bracket for the plurality of Hall element sensors, the bracket having an underside surface and further having:

an encasement for each of said Hall element sensors, each encasement forming at least one void for receiving the Hall element sensors each void further defined by;

i) a back wall for abutting the back surface of each Hall element sensor case, ii) a first side wall and a second side wall for surrounding the side surfaces of the Hall element sensor case, the back wall coupled between the first side wall and the second side wall, iii) a first front tab coupled to the first side wall opposite the back wall coupling and a second front tab coupled to the second side wall opposite the back wall coupling, the first front tab, first side wall, back wall, second side wall and second front tab formation creating a partially open front wall for abutting the forward surfaces of the Hall element sensor case, and iv) at least two center lead guide pins extending from the back wall and centered thereon between the first and second side walls which form a center lead guide channel between adjacent pins and being a predetermined height for abutting the bottom surface of each Hall element sensor case, each lead guide channel being a predetermined distance from adjacent lead guide channels each pin having a predetermined height, v) the first front tab, first side wall, back wall, second side wall and second front tab formation having a height extending above the height of the center lead guide channel so as to substantially encompass the back surface, the side surfaces and the bottom surface of each Hall element sensor case and closely surround each Hall case; and vi) means for receiving and securing a printed circuit board on the underside surface, the commutator assembly further including c.) a printed circuit board attached to said bracket on the underside surface and having holes for receiving the first, center and third leads and making electrical connections therewith.

11. The bracket according to claim 10 wherein;

the printed circuit board holes for receiving the center leads are spaced at the predetermined distance of the center pin guide slots.

12. The bracket according to claim 10 further comprising:

a receiving plate for mounting an optical encoder thereon.

13. The bracket according to claim 10 further comprising:

strain relief means for attaching connecting wires.

14. The bracket according to claim 13 wherein;

the strain relief means are pins extending from a substantially planar surface of the bracket.

15. The bracket according to claim 10 further comprising:

mounting holes for attachment of the bracket to other assemblies.

16. The bracket according to claim 10 wherein;

the first and second front tabs are constructed and arranged to contact the Hall element sensors at a forward surface thereof which are angular to the back surface thereby placing a forward surface of the Hall element sensor substantially even with the partially open front wall.

* * * * *